US005107701A

United States Patent [19]

Smith

[11] Patent Number: 5,107,701

[45] Date of Patent: Apr. 28, 1992

[54] FUEL INJECTOR TESTING HARNESS

[76] Inventor: J. Nicholas Smith, 10423 Carmer Rd., Fenton, Mich. 48430

[21] Appl. No.: 566,633

[22] Filed: Aug. 13, 1990

[51] Int. Cl.$^5$ .......... G01M 19/00

[52] U.S. Cl. .......... 73/119 A

[58] Field of Search .......... 73/119 A, 118.1, 117.3, 73/116

[56] References Cited

U.S. PATENT DOCUMENTS

| | | | |
|---|---|---|---|
| 3,875,792 | 4/1975 | Krohn et al. | 73/119 |
| 3,919,885 | 11/1975 | Kaireit | 73/119 |
| 3,940,977 | 3/1976 | Voross et al. | 73/116 |
| 4,079,310 | 3/1978 | Ortmann | 324/15 |
| 4,246,566 | 1/1991 | Endo et al. | 340/52 |
| 4,499,876 | 2/1985 | Yamamoto | 123/446 |
| 4,527,424 | 7/1985 | Takahashi | 73/119 |
| 4,557,141 | 10/1985 | Poiriea et al. | 73/117.2 |
| 4,644,284 | 2/1987 | Friedline et al. | 324/397 |
| 4,756,186 | 7/1988 | Sangawa | 73/119 |
| 4,788,858 | 12/1988 | Lieberman | 73/119 A |
| 4,798,084 | 1/1989 | Takahashi et al. | 73/119 |
| 4,841,765 | 6/1989 | Blanke | 73/119 |

*Primary Examiner*—Jerry W. Myracle
*Attorney, Agent, or Firm*—Krass and Young

[57] ABSTRACT

An electrical wiring harness for testing the fuel injection system of an internal combustion engine, consisting of a collection of individual wiring pairs interposed between the vehicle electronic control unit and the individual fuel injectors, and a series of switches for selectively disabling one or more individual field injectors, as desired.

5 Claims, 1 Drawing Sheet

FUEL INJECTOR TESTING HARNESS

FIELD OF THE INVENTION

The invention relates to apparatus for testing the operation of fuel injectors in internal combustion engines.

BACKGROUND OF THE INVENTION

Because of the demands placed on the automotive industry by government fuel economy and exhaust emissions standards, fuel injection systems for internal combustion engines have, in recent years, overtaken standard carburetion as the means for providing a measured charge of suitable fuel and air mixtures to the combustion chamber of an internal combustion engine. Normally aspirated internal combustion engines mix the fuel and air required to create a suitable combustion mix in a carburetor. The combined fuel and air mixture is then drawn into the combustion chamber of the internal combustion engine by the normal operating vacuum of the engine. In fuel-injected engines, fuel and air are separately delivered to the engine combustion chamber. A precisely metered amount of fuel is "injected" into the intake manifold in the form of an atomized fuel charge. The advantages gained by the use of fuel injection include improved performance and fuel economy. By virtue of sophisticated micro computers, the amount of fuel which is to be injected into each cylinder can be precisely adjusted based on a wide variety of external conditions, including outside air temperature, engine temperature, humidity levels, atmospheric pressure and exhaust content. In modern fuel-injected engines, a central electronic control unit monitors these, and other factors, and regulates the performance of the overall fuel injection system based thereon.

Successful operation of fuel-injected engines, however, requires optimized performance from each individual electronically operated fuel injector. Degradation in the performance of any individual fuel injector, however, is extremely difficult to monitor while the vehicle is actually in operation. While test equipment has been devised to monitor the operation of electronic fuel injectors in an automotive garage environment, means to test fuel injectors under actual operating conditions have heretofore been unduly complex and expensive.

The problem of testing individual cylinder performance based on selective operation of fuel injectors is compounded by the adoption of multi-port fuel injection systems in modern automotive engines. Multi-port fuel injection involves a simultaneous operation of a group of fuel injectors under a single command from the motor vehicle electronic control unit. Accordingly, it is difficult to control, electronically, the electronic control unit itself on a selective basis, without disabling an entire group of fuel injectors simultaneously. Sequential port fuel injection, on the other hand, involves selective operation by the electronic control unit of individual fuel injectors. However, this sequential operation of fuel injectors is controlled by a pre-programmed series of instructions contained within the electronic control unit itself, again making it impossible to instruct the electronic control unit to selectively operate only a single fuel injector on demand.

The technique of individual operation of fuel injectors for testing purposes is taught by Kaireit, in U.S. Pat. No. 3,919,885. Kaireit teaches the individual, selective operation of fuel injectors. However, in order to determine fuel injector operation, it is necessary to visualize the output of the fuel injector, as taught by Kaireit. Of course, such visualization is impossible when a vehicle is in operation.

Blanke, in U.S. Pat. No. 4,841,765, teaches the manual disablement of individual fuel injectors by disconnecting the electrical wire leading to the fuel injector, or by disconnecting the fuel line leading to the fuel injector. Again, this methodology is unsuitable for use while the vehicle is in actual operation. Devices to measure the volume of fuel utilized by fuel injectors are taught by Takahashi et al, in U.S. Pat. No. 4,798,084, and the monitoring of the operation of fuel injectors while the vehicle is in motion is taught by Krohn et al, in U.S. Pat. No. 3,875,792.

None of these apparatus or method patents, however, provide the necessary improvements to allow selective electronic disabling of the fuel injectors while the vehicle is in motion, and all require the installation of substantial and sophisticated test consoles, interposed between the various engine sensors and the test equipment.

The present invention comprises a simple apparatus for individually disabling electronic fuel injectors in an internal combustion engine, allowing the vehicle fuel injection system to be tested while the vehicle is in normal operation.

OBJECTS OF THE INVENTION

It is an object of this invention to provide an apparatus for selectively disabling individual fuel injectors in the internal combustion engine, while the vehicle in which the engine is located is operating in its normal environment.

It is another object of this invention to provide an apparatus for determining the failure of one or more individual fuel injectors in an internal combustion engine.

SUMMARY OF THE INVENTION

The above and other objects are accomplished in accordance with this invention by providing a switchable wiring harness which is interposed between the electronic control unit module of an internal combustion engine and the individual fuel injectors, said harness being provided with a plurality of individually operable switches, capable of interrupting the electrical power supply to individual fuel injectors.

DESCRIPTION OF THE PREFERRED EMBODIMENT

Figure 1:
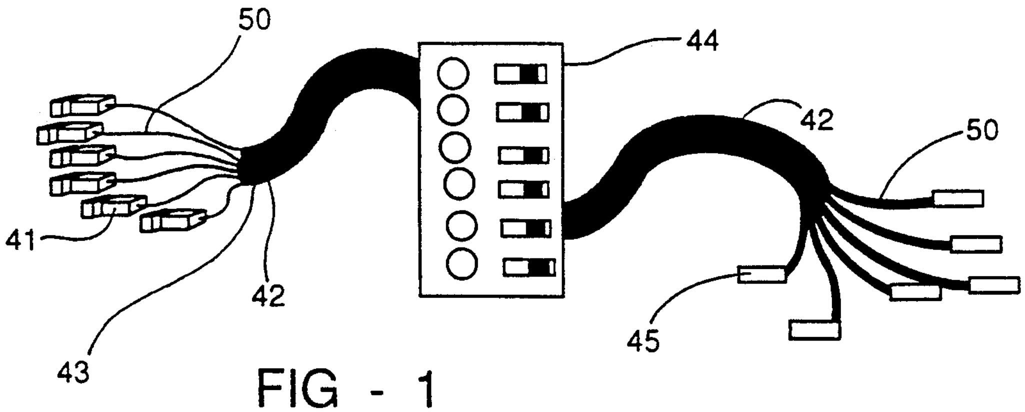
FIG. 1 is a simplified view of the invention, showing the wiring harness, the switch console and the electrical connectors.

With reference first to FIG. 1 of the drawings, a wiring harness 42 consists of a plurality of wiring pairs 50, each pair provided with a plurality of electrical connectors 41 at one end. Said electrical connectors 41 are configured so as to allow rapid connection and disconnection of the entire test harness assembly to the electronic fuel injection harness of a standard electronic control unit for an internal combustion engine. On the opposite end of the harness 42 are a plurality of electrical connectors 45, each said connector of suitable configuration to connect to the electrical terminals of a standard internal combustion engine fuel injector.

The wiring harness 42 is of sufficient length to permit the routing of switch console 44 into the operator's compartment of the vehicle in which the internal combustion engine is located, while still allowing connectors 41 to be connected to the electronic control unit, fuel injection harness, and connectors 45 to be attached to the individual fuel injectors of the internal combustion engine. Each individual wire of pair 50 is insulated, and each pair 50 is likewise insulated. Harness 42 is sheathed in an abrasion and weather resistant insulating covering 43.

Figure 2:
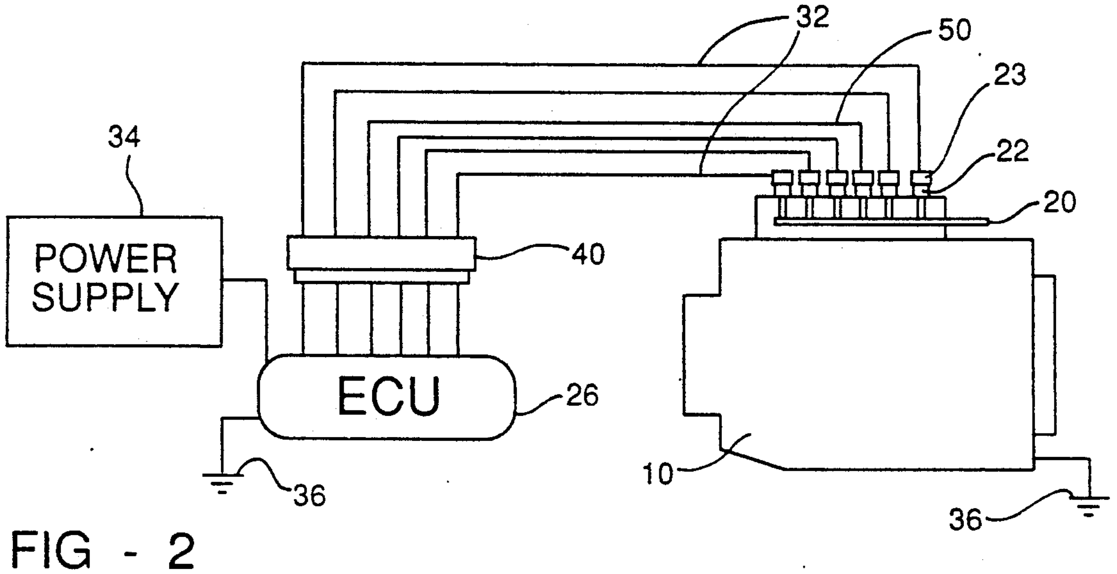
FIG. 2 is a simplified schematic drawing, showing the electrical connections between an electronic control unit and the fuel injectors of an internal combustion engine.

Referring now to FIG. 2, a simplified schematic of the operation of a typical fuel injection system is shown. Fuel is delivered through fuel lines 20 to fuel injectors 22 in a conventional internal combustion engine 10. Fuel injectors 22 may be any of a variety of commercially available devices, which are designed to inject a specified fuel charge into the intake manifold of the internal combustion engine 10 in response to a predetermined electrical signal from the electronic control unit (ECU) 26. Electronic control unit 26 typically is a micro processor controlled electronic circuit which is pre-programmed to provide specified electronic signals to each fuel injector in response to known engine operating conditions. The electronic control unit receives its electrical power through the electrical power supply 34 and the vehicle ground 36. Pre-programmed instructions regarding the duration of fuel injector operation are stored in memory in the electronic control unit. During engine operation, power to each individual fuel injector is applied for a pre-determined time through fuel injector wiring harness 32. The vehicle injector wiring harness 32 is removably connected to the electronic control unit by means of an electrical connector 40. Typically, each individual fuel injection wiring lead consists of an insulated wire pair 50 further consisting of an insulated positive and negative signal wire. Each lead is attached to an individual fuel injector with a connector 23. Typically, the positive wire is a continuous connection to the vehicle positive power supply while the negative wire constitutes the signal transmitting wire. When the electronic control unit sends a "turn off" signal to the fuel injector, it does so by interrupting the negative or ground wire of the wire pair. The "turn on" signal is sent to the fuel injector by completing this circuit. In this fashion, operation of each individual fuel injector is accomplished.

Figure 3:
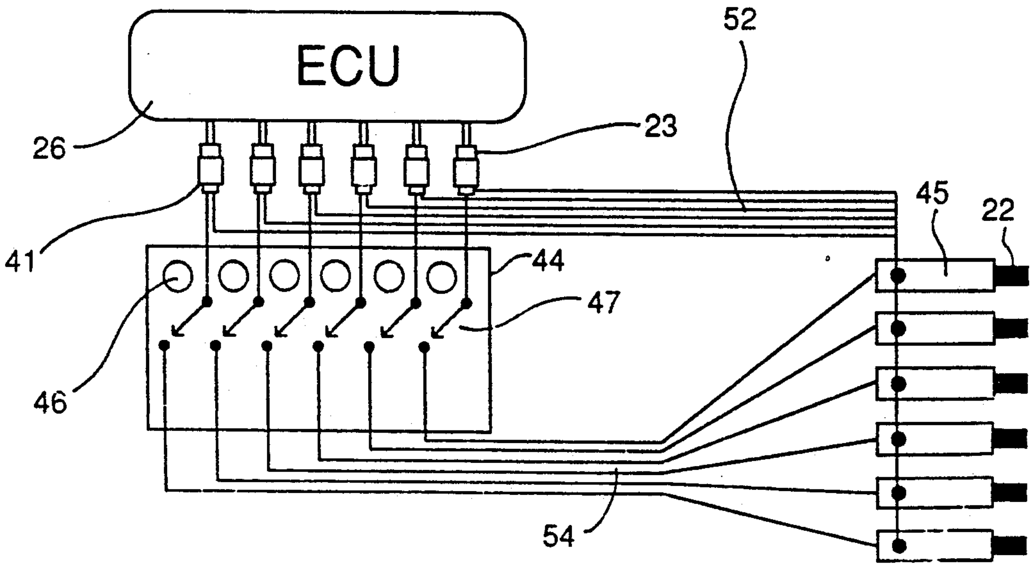
FIG. 3 is a detailed schematic illustrating the present invention.

With respect to the present invention, FIG. 3 shows a detailed schematic of the apparatus and its operation. First, the existing vehicle fuel injection wiring harness 32, (as shown in FIG. 2), is disconnected at fuel injectors 22. The test harness connectors 41 are then connected to electronic control unit fuel injector connectors 23 and test harness connectors 45 are connected to the individual fuel injectors 22. The testing harness consists of a plurality of wire pairs, including continuous vehicle power supply wires 52, and interrupted vehicle ground wires 54. Each of the individual fuel injector connectors are connected to the vehicle electronic control unit through connectors 41. Each individual conductor 54 is interrupted by an individually operable switch 44. In this fashion, each fuel injector may be individually disabled by selective operation of the appropriate individual switch 47. The individual switches 47 are preferably mounted in a single console 44, wherein each switch is individually operable, and each switch is individually identified by a number corresponding to a single cylinder in the internal combustion engine. Once the testing harness has been attached between the electronic control unit and the individual fuel injectors, the switch console 44 can be located within the operator's compartment of the vehicle, thereby permitting selective disablement and operation of each fuel injector from within the operator's compartment while the vehicle is in motion. Operatively associated with each switch 47 is visual indicator 46, preferably in the form of a light-emitting diode, which serves to visually confirm that the circuit formed by switch 47 with individual injector connector 45 is either open or closed.

In the preferred embodiment, testing of the vehicle fuel injection system is accomplished as follows:

With the testing harness in place as above described, the vehicle is put into normal operation. Each individual fuel injector is then selectively disabled by opening the individual switches 47 mounted on console. The operator compares the performance of the vehicle before and after the individual switches are selectively disabled. By comparing the internal combustion engine opera ion before and after disabling individual fuel injectors through individual selector switches, the operator can rapidly determine which, if any, of the individual fuel injectors are malfunctioning. The above described embodiment of the invention can be helpful in locating fuel injectors having degraded or unsatisfactory performance in gasoline engines.

While a specific embodiment of the present invention has been disclosed it will be understood that many variations and modifications can be affected thereto without departing from the spirit and scope of the invention.

What is claimed is:

1. An electrical wiring harness for testing the fuel injection system of an internal combustion engine, said harness containing a plurality of electrical conductor pairs, each pair comprising:

a) a first continuous electrical conductor;

b) a second electrical conductor; and c) a switch connected to said second electrical conductor and disposed in series therewith to affect selective electrical continuity or discontinuity of said second electrical conductor, a first electrical connector array disposed on one end of said harness, said array having a plurality of discrete electrical connectors, each said connector corresponding to one end of each said first and said second electrical conductors, each said connector further having a physical and electrical configuration matable with an electrical connector of the electronic fuel injection harness of the electronic control module on an internal combustion engine, and a second electrical connector array disposed on the opposite end of said harness, said second electrical connector array having a plurality of second individual connectors, one of each said second individual connectors electrically corresponding to one of each said discrete electrical connectors and disposed and adapted for physical and electrical connection of one of said second individual electrical connectors to an electronic fuel injector device mounted on said engine.

2. The invention of claim 1, wherein each said switch is mounted on a common switch-carrying console.

3. The invention of claim 2, wherein said switch-carrying console is electrically connected to said plurality of conductors by a wire extension of sufficient length to permit location of the switch-carrying console in the operator's compartment of a vehicle utilizing said internal combustion engine, during operation of said internal combustion engine.

4. An electrical wiring harness for testing the fuel injection system of an internal combustion engine, said harness containing a plurality of electrical conductor pairs, each pair comprising:

a) a first continuous electrical conductor;

b) a second electrical conductor;

c) a switch connected to said second electrical conductor and disposed in series therewith to affect selective electrical continuity or discontinuity of said second electrical conductor;

d) an electrically operable visual indicator associated with said switch, whereby said indicator presents a visual signal upon operation of said switch; and a first electrical connector array disposed on one end of said harness, said array having a plurality of discrete electrical connectors, each said connector corresponding to one end of each said first and said second electrical conductors, each said connector further having a physical and electrical configuration matable with an electrical connector of the electronic fuel injection harness of the electronic control module on an internal combustion engine, and a second electrical connector array disposed on the opposite end of said harness, said second electrical connector array having a plurality of second individual connectors, each disposed and adapted for physical and electrical connection of one of said second individual electrical connectors to an electronic fuel injector device mounted on said engine.

5. The invention according to claim 4, which further comprises an electrically non-conductive, abrasion-resistant and waterproof sheath and closing said plurality of electrical conductor pairs.

* * * * *